(12) United States Patent
Bennett (10) Patent No.: US 7,114,104 B1
(45) Date of Patent: Sep. 26, 2006

(54) SYSTEM AND METHOD OF FAULT DETECTION IN A UNIX ENVIRONMENT

(75) Inventor: Earl W. Bennett, Novi, MI (US)

(73) Assignee: Compuware Corporation, Detroit, MI (US)

( * ) Notice: Subject to any disclaimer, the term of this patent is extended or adjusted under 35 U.S.C. 154(b) by 624 days.

(21) Appl. No.: 10/364,728

(22) Filed: Feb. 11, 2003

(51) Int. Cl.
*G06F 11/00* (2006.01)

(52) U.S. Cl. ...................................................... 714/38
(58) Field of Classification Search ................ 714/38, 714/39, 47, 34, 35, 37; 717/127, 129
See application file for complete search history.

(56) References Cited

U.S. PATENT DOCUMENTS

| | | | | |
|---|---|---|---|---|
| 4,635,258 A * | 1/1987 | Salowe | .................. | 714/47 |
| 4,996,688 A * | 2/1991 | Byers et al. | .................. | 714/45 |
| 5,440,726 A * | 8/1995 | Fuchs et al. | .................. | 714/20 |
| 5,696,701 A * | 12/1997 | Burgess et al. | ................ | 714/25 |
| 6,701,460 B1 * | 3/2004 | Suwandi et al. | ............... | 714/41 |
| 6,718,482 B1 * | 4/2004 | Sato et al. | ...................... | 714/4 |
| 6,961,874 B1 * | 11/2005 | Lodrige | ........................ | 714/38 |
| 2002/0073400 A1 * | 6/2002 | Beuten et al. | ............... | 717/127 |
| 2003/0056199 A1 * | 3/2003 | Li et al. | ....................... | 717/127 |
| 2003/0056200 A1 * | 3/2003 | Li et al. | ....................... | 717/128 |

* cited by examiner

*Primary Examiner*—Nadeem Iqbal
(74) *Attorney, Agent, or Firm*—Fenwick & West LLP (57) ABSTRACT

Systems and methods of fault detection in a Unix environment. A fault monitor uses process identifiers to access the process control file and status file maintained by the operating system. The fault monitor evaluates process interruptions indicated by the process control signals and selectively communicates information regarding detected interruptions through an event router. The fault monitor uses a fault detection driver that redirects fork requests in order to collect new process identifiers. The fault detection driver modifies the process table associated with the call dispatcher to insert itself between the call dispatcher and the fork routine.

36 Claims, 4 Drawing Sheets

SYSTEM AND METHOD OF FAULT DETECTION IN A UNIX ENVIRONMENT

BACKGROUND OF THE INVENTION

1. Field of the Invention

The invention relates to the field of process monitoring and fault detection in a Unix environment.

2. Description of the Related Art

Unix servers are used extensively throughout industry for web servers, application servers, database servers, and other mission critical enterprise system components. Abnormal terminations (abends) of programs and processes: 1) lead to lost sales or production; 2) leave internal users idle; and 3) require development resources to work on outages versus new development and maintenance. These outages, regardless of size, impact productivity of the organization and collectively have a large cost associated with them. Unix systems, such as the Solaris™ OS from Sun Microsystems of Santa Clara, Calif., have provided no method of automatically detecting when a program terminates abnormally and then locating and collecting key information about the program and the cause of termination.

Most operating systems include fault handling utilities for generating an error message and a simple core dump in the event of an abend or interruption in processes running under the OS. While a core dump is useful for troubleshooting and analysis after an abend, it may not capture all information desired, it does not organize the captured information in an intuitive fashion, and it does not provide robust analysis, notification, or archiving of captured information. In order to provide a more complete fault handling solution that integrates with the workflow of developers, maintainers, and administrators, many fault analysis products have evolved for various OSs. For example, CICS ABEND-AID FX™, available from Compuware Corp. of Farmington Hills, Mich., provides extensive capture and analysis of abending processes in IBM mainframe environments, such as OS/390 or z/OS with CICS, MVS, or DB2 support. These fault analysis products provide fault management within a limited computing environment.

Enterprise computer systems have become increasingly complex with a large number of computer system contributing functions, data, communications, and user interfaces. All of these systems include processes that may generate interruptions, such as abends, time-outs, and other errors. Managing these interruptions is one of the primary challenges of administering an enterprise computer system. Fault administration applications have been developed to gather information on process interruptions throughout monitored systems. The gathered information can then be archived, abstracted, reported, used to generate notifications, or initiate real-time troubleshooting. Fault administration applications may use platform independent messaging and data formats to gather fault information from disparate platforms. For example, the fault administration application may include an event router on a computer system running a Windows NT OS from Microsoft Corp. and receive interruption event messages from both NT and OS/390 computer systems. Fault Manager 2.5 from Compuware Corp. is a fault administration application that supports event aggregation from multiple computing environments. Fault administration applications provide fault management solutions for multi-platform enterprise computing environments.

In order to provide fault management functions across multiple computer systems, a component for monitoring processes within each system is typically provided. The process monitoring components are customized to the OS running on each system. For example, a Windows NT compatible monitoring component would be present on each Windows NT system and z/OS compatible monitoring component would be present on each z/OS system. The monitoring components must be capable of identifying the abnormal termination of processes running on their respective systems. The monitoring components provide notification of an abending process to the fault management application. The monitoring components also assist in identifying the location of key information regarding terminating processes, so that the information can be collected for use by the fault management application.

Unix operating systems lack well-documented APIs for identifying and monitoring processes and capturing their abend information. Some example Unix-based operating systems include: AIX, A/UX, BSD, Debian, FreeBSD, GNU, HP-UX, Linux, NetBSD, NEXTSTEP, OpenBSD, OPENSTEP, OSF, POSIX, RISCiX, Solaris, SunOS, System V, Ultrix, USG Unix, Version 7, and Xenix. A Unix environment is one or more computers running a Unix-based operating system and associated application programs and data sources. There is a need for a fault monitoring component that identifies abending processes and assists in reporting and capturing abend information from within a Unix environment. Such a fault monitoring component would allow fault management in Unix environments and through multi-platform fault administration applications.

SUMMARY OF THE INVENTION

A system and method of fault detection in a Unix environment is disclosed. In one embodiment, a fault management system operates in conjunction with a Unix environment. A fault monitor signals interruptions of monitored processes within the Unix environment. The fault monitor watches operating system resources associated with identified processes to determine when an interruption is occurring, evaluates the status of the process, and selectively signals the interruption. The fault monitor uses a fault detection driver to identify the start of new processes and locate the operating system resources associated with those processes for monitoring. For example, the fault detection driver may use the call dispatcher to determine when a new process is begun and capture its process identifier. The fault monitor may then use the process identifier to locate and monitor the process control file and status file associated with the process. In one embodiment, the fault monitor signals interruptions to an event router which may, in turn, signal the interruption and provide key information to fault handling resource, such as a fault administration system, located within or outside the Unix environment.

BRIEF DESCRIPTION OF THE DRAWINGS

These and other features of the invention's embodiments are more fully described below. Reference is made throughout the description to the accompanying drawings, in which.

DETAILED DESCRIPTION OF THE INVENTION

Figure 1:
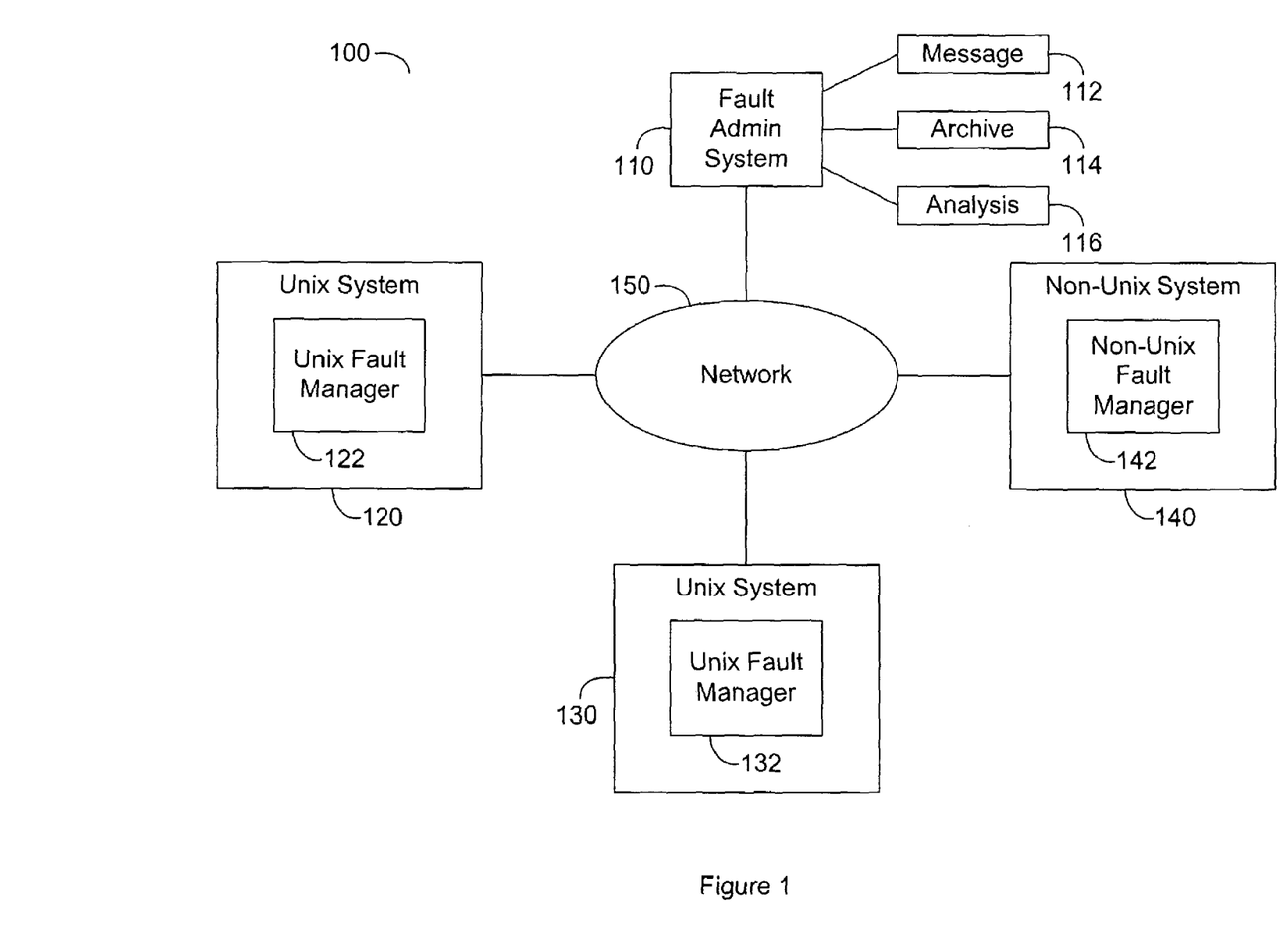
FIG. 1 is a block diagram of an example enterprise computer system including multiple OS environments and a fault administration system.

FIG. 1 shows an enterprise computer system 100 including several computer systems interconnected by a network 150. The enterprise computer system 100 includes a fault administration system 110, two Unix systems 120 and 130, and a non-Unix system 140. Each of these systems represents a conventional computer system interconnected using conventional networking technologies. For example, one Unix system 120 may be a Web server, the other Unix system 130 may be a database server, and the non-Unix system 140 may be a legacy order processing system. Their combined function for the enterprise may be as an e-commerce platform or another mission critical system. These systems are monitored by the fault administration system 110. The fault administration system 110 is another server or personal computer with fault administration software for receiving fault information from the other systems and providing fault handling, such as messaging, archiving, aggregation, or analysis. Each of the other systems includes a fault manager component 122, 132, and 142 that communicates with the fault administration system 110 over the network 150.

The fault administration system 110, the Unix systems 120 and 130, and the non-Unix system 140 may be embodied in a variety of conventional computer systems. For example, they may be mainframes, mainframe regions, rack servers, personal computers, or special purpose computing devices, such as routers, security gateways, control systems, or mobile computing devices. Each computer system includes at least a microprocessor, memory, communication device, and operating system. Each computer system may also include a variety of other input, output, and peripheral devices, as well as application software. Each computer system may rely on one or more terminals, workstations, or remote computer systems for accessing their functions. In alternate embodiments, one or more of the systems may share resources with the other systems. For example, the fault administration system 110 may actually be a hosted on the non-Unix system 140. The combination of systems shown is an example only and any number and variety of systems may be interconnected with one or more fault administration systems in accordance with the invention.

The fault administration system 110 is a fault handling resource for receiving and processing fault information from the other systems. The fault administration system 110 receives fault messages through the network 150 according to a predetermined protocol and message format. For example, the fault administration system 110 may receive fault messages comprised of XML documents containing tagged fault information. Each document includes a fault record for a single abend or other error. In an alternate embodiment, the fault administration system receives aggregate fault records from the monitored systems. The fault information describes the nature, scope, and timing of the error generated by the monitored system (e.g., Unix systems 120 and 130 and non-Unix system 140). The fault information may also provide data location information for querying or accessing additional fault information stored by the monitored systems.

The fault administration system 110 uses the fault information received from the monitored systems to enable various administrative functions. The fault administration system aggregates and stores fault records or information extracted from the fault records in a database for use in administration of the monitored systems. The centralization and aggregation of fault data allows enterprise level administration of system faults. The fault administration system 110 includes logic for handling the received fault information. Example fault administration functions include a message function 112, an archive function 114, and an analysis function 116.

The message function 112 evaluates received fault information and selectively provides real-time or aggregate notification to stakeholders, such as system administrators and technology managers. For example, the message function may include severity thresholds that, if exceeded by incoming fault information, generate an electronic mail message to the system administrator. Other applications and embodiments of the message function 112 will be manifest to those familiar with fault administration systems and other automated messaging systems.

The archive function 114 provides long-term storage of fault records or extracted information. The archive function 114 may archive all fault records or may include logic for evaluating what information is worth storing. The archive function 114 may aggregate data over a specified period before compressing and storing it. For example, at the end of each month, the archive function may aggregate and compress the month's fault records and store them as a package in a data archive. Other applications and embodiments of the archive function 114 will be manifest to those familiar with fault administration systems and other data archiving systems.

The analysis function 116 provides an interface for abstracting patterns and trends within the aggregated fault data. The analysis function 116 may include aggregating data according to systems, dates, timing, functions, error type, severity, impact, or other fault information. The analysis function 116 may also include calculation of metrics, layered abstraction, visualization, and other complex functions. For example, the analysis function 116 may allow an administrator to view a graph showing faults classified by system and error type for a specified period to identify problem areas. Other applications and embodiments of the analysis function 118 will be manifest to those familiar with fault administration systems and other data mining and analysis systems.

The Unix systems 120 and 130 are computer systems running a Unix-based operating system. Each of the Unix systems 120 and 130 include the fault manager components 122 and 132 that identify processes within the Unix environment, monitor them for faults, and collect fault information in the event of an error. The fault manager components 122 and 132 are software applications running in the Unix environment. In an alternate embodiment, the fault manager components are integrated into the builds of the Unix-based operating systems as standard utilities. The fault manager components 122 and 132 are further described below with regard to FIGS. 2–4.

The non-Unix system 140 is a computer running a non-Unix-based operating system, such as Windows NT, Windows 2000, z/OS, or OS/390. The non-Unix system 140 includes the fault manager component 142 that identifies processes within the non-Unix environment, monitors them for faults, and collects fault information in the event of an error. A different fault manager component 142 is used for each different non-Unix-based operating system. The fault manager component 142 is generally a software application running in the non-Unix-OS environment. However, the fault manager component 142 could be integrated into the OS as a standard utility.

The network 150 is a conventional network for providing communications among the various systems. The network 150 may be embodied in a wide area network, such as the Internet, or a local area network, such as a company LAN. In one embodiment, the network 150 is a conventional Ethernet LAN using appropriate communication protocols. In an alternate embodiment, the network 150 is the Internet and TCP/IP is used for communication. Any variety of wired, wireless, central, or distributed communication network may be used for the network 150, as long as it provides sufficient bandwidth communications for fault information to be communicated from the monitored systems 120, 130, and 140 to the fault administration system 110.

Figure 2:
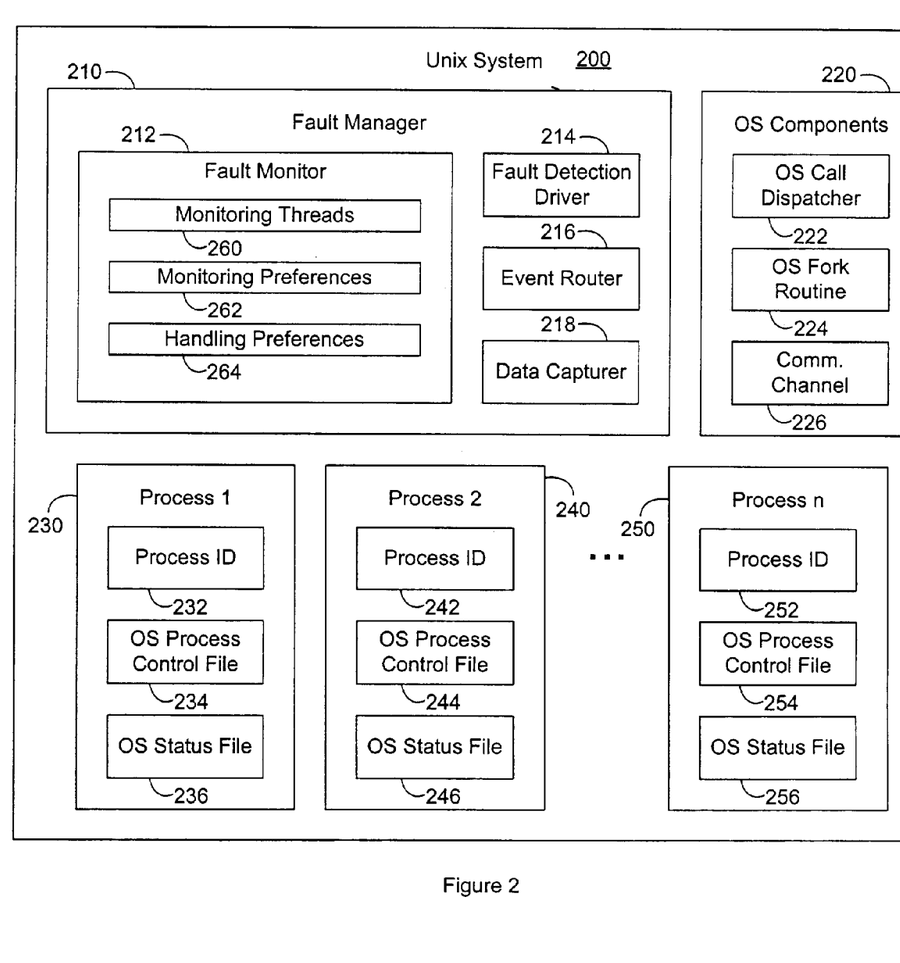
FIG. 2 is a block diagram of an example Unix system with a fault management component for monitoring multiple processes.

FIG. 2 shows a Unix system 200 with a fault manager 210 for monitoring faults in a plurality of processes 230, 240, and 250. The Unix system 200 is a computer system running the Solaris OS. While the example embodiment is based upon the Solaris OS, it will be understood that it may be adapted to any Unix-based OS that uses similar process management architecture. FIG. 2 includes OS components 220, which shows some relevant components of the OS process management architecture for enabling one embodiment of the fault manager 210. Additional OS components that relate to specific process threads are shown with regard to the processes 230, 240, and 250. Obviously, the Solaris OS includes a large number of additional components, some of which relate to the process management architecture. However, these additional components are well documented with regard to most Unix-based OS and there is no need to include them here. Those of skill in the art will understand how the components shown and other facilities implicitly used by the fault manager application relate to the OS as a whole.

The fault manager 210 is a software component running in the Unix system 200. The fault manager 210 identifies other processes running within the Unix system, monitors those processes, and generates a message containing fault information in the event of an error. The fault manager 210 includes a fault monitor 212, a fault detection driver 214, an event router 216, and a data capturer 218. The fault monitor 212 instantiates a thread for monitoring each process running within the OS and modifies select OS resources associated with each process in order to monitor and evaluate the status of each process. The fault monitor 212 includes process monitoring threads 260, process monitoring preferences 262, and interrupt handling preferences 264. The fault detection driver 214 provides the logic for identifying new processes and identifying the OS resources necessary for monitoring those processes. The event router 216 provides the logic for directing one or more messages containing fault information to desired fault handling resources. The data capturer 218 provides the logic for harvesting fault information from various system resources. The properties, operations, and messages of the fault monitor 212, the fault detection driver 214, and the event router 216 are provided below with regard to FIGS. 3 and 4.

The properties, operations, and messages of the data capturer 218 are beyond the scope of this description. Capturing additional fault information, beyond that which is used by the fault monitor 212 to provide interrupt analysis and the event handler 216 to identify the process and interruption, is an optional function of fault manager 210. The data capturer 218 can be embodied in modules of widely varying complexity. The implementation of data capture for abending processes is well-known in the art and is a design choice with little bearing the described embodiments of the invention.

The OS components 220 include several components of the Unix system 200 that are important for understanding the operation of the fault manager 210. The OS components 220 include an OS call dispatcher 222, and OS fork routine 224, and a communication channel 226. Other OS components are instantiated for each process running under the OS, as shown for the processes 230, 240, and 250. These additional OS components include OS process control files 234, 244, and 254 and the OS status files 236, 246, and 256.

The OS call dispatcher 222 is part of the OS system call interface (not shown). The OS call dispatcher 222 receives user system calls and determines the address of the system routine that fulfills the call. The OS call dispatcher 222 maintains a table (e.g., _sysent) that maps call references, usually a call name (e.g. fork( )), to a memory location at the beginning of a block providing the system routine logic. The OS call dispatcher 222 initiates execution of the instructions located at the address and provides any arguments included in the call to the system routine. The OS call dispatcher 222 may also receive output from the system routine once it is executed. For example, the OS call dispatcher 222 receives the process ID associated with a new process started with the fork routine. Some OS have multiple tables for mapping system calls to system routines. For example, the 64-bit version of Solaris includes two call tables, _sysent and _sysent32.

The OS fork routine 224 is a system routine invoked by the OS to start a new process. The new process, or child process, is an exact copy of the calling process, or parent process. The child process inherits most of its attributes from the parent process, but it receives its own process ID, entries within the process control data structure, associated memory allocations, and a few other unique attributes. The OS fork routine 224 returns the process ID of the child process to the parent process. The OS fork routine 224 is used by the OS to start almost all new processes. Some OS include multiple fork routines with associated system calls. For example, Solaris includes fork( ), vfork( ), and fork1( ) system calls for accessing three variations on the OS fork routine 224.

The processes 230, 240, and 250 represent any number of processes 1 through n presently being handled by the Unix system 200. The processes 230, 240, and 250 include all user processes that are using memory, processor, or port resources within the Unix system 200. Once installed, the fault detection driver 212 will accumulate process Ids for each new process as that new process is invoked via the OS fork routine 224. The processes 230, 240, and 250 are handled by the OS process scheduler (not shown) and have corresponding memory locations overseen by the OS memory manager (not shown). The processes 230, 240, and 250 may typically include any number of applications or application threads (for multithreaded applications) depending on the applications being run on the Unix system 200. The processes 230, 240, and 250 represent user processes and do not include various OS processes, such as those used for initialization, process management, memory management, and device management.

Each new process is represented in a data structure in memory that provides information for the OS to use in managing and executing the process. This data structure includes a unique process ID for each process, such as process Ids 232, 242, and 252. The data structure also includes relationships to associated processes, such as parent and child processes, and pointer fields for locating other information associated with the process. All active processes, starting with the init process, are organized in a process table and are accessed according to their process ID. The OS also maintains process control information and status information for each process. This information is stored in a process control file and a status file associated with each process and these files may be located through the process table and process data structure using the process IDs. For example, the processes 230, 240, and 250 have their respective OS process control files 234, 244, and 254 and their respective OS status files 236, 246, and 256 located using their respective process Ids 232, 242, and 252.

The OS process control files 234, 244, and 254 provide a memory area for each process that may be opened, read, and written to by other processes. Each OS process control file can include a number of control messages, which are used to govern the process. For example, each OS process control file may be an array in which each element is a control message. The messages include scripts for handling control information regarding the process. For example, control information may include calls to system routines and return codes from system routines. Messages may include monitoring threads, call traces, responses to specific return codes, or commands to suspend or continue processing.

The OS status files 236, 246, and 266 provide a memory are for each process that holds status information. The status information is provided as a predefined set of codes that fit within the status file memory block. The status code includes a basic status code and an explanation code. Basic status codes reflect that the process is running, returning from a system call, processing an interrupt routine, processing a system call, ready, or waiting. The explanation code provides additional detail, such as waiting for a particular child process. The codes stored in each status file are modified as the status of the process changes. The OS status files 236, 246, and 256 may be read to gather information about the current status of their respective processes 230, 240, and 250.

Figure 3:
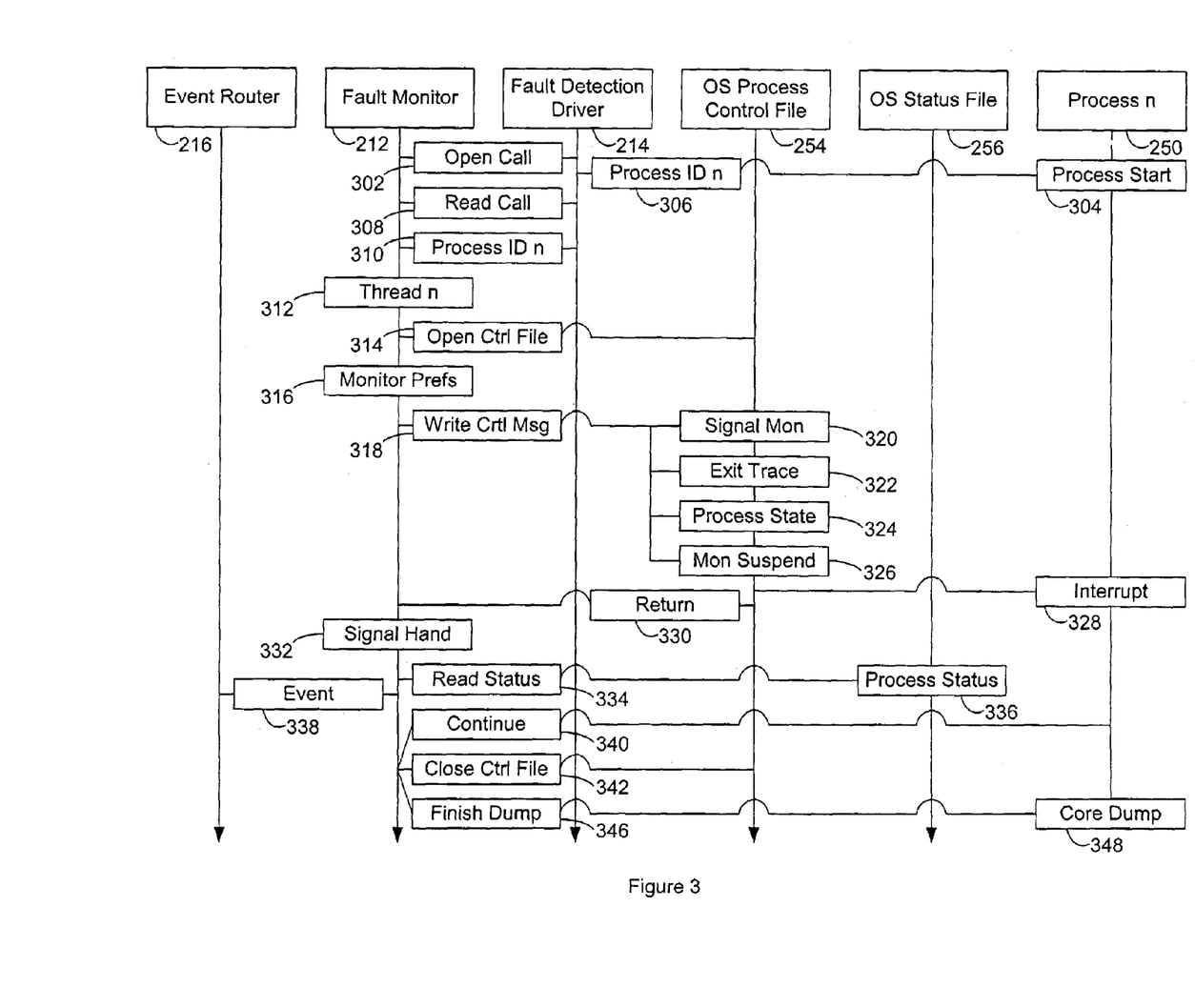
FIG. 3 is a ladder diagram describing the operation of an example fault monitor in a Unix environment.

FIG. 3 is a ladder diagram explaining selected operations of the fault manager 210. FIG. 3 describes the monitoring and event generation process for an example process n 250. The fault manager 210 relies on the fault monitor 212 to drive operation of the monitoring process. The fault detection driver 214 and the event router 216 support the operations of the fault monitor 212. The fault monitor 212 interacts with the OS process control file 254 and the OS status file 256 associated with the process n 250 to establish monitoring conditions, identify interruptions, and analyze those interruptions.

The fault monitor 212 initiates fault monitoring by issuing an open call 302 to the fault detection driver 214. When the fault detection driver 214 receives the open call 302, it begins monitoring for new processes. When a process starts 304, the process ID n 252 is generated for controlling and managing the process. The process ID n 252 is communicated 306 to the fault detection driver 214. The process ID n 252 is intercepted and stored by the fault detection driver 214. The fault detection driver 214 may store the process IDs in any number of data structures. For example, the process IDs may be stored in a linked list in a known storage location. The linked list may provide a fixed number (e.g., 10) of storage locations. The fault detection driver 214 using linked lists provides storage beyond the fixed number by including a pointer to a new storage location allocated for another process ID list. In an alternate embodiment, the process IDs are stored in a table associated with the fault detection driver 214. Operation of the fault detection driver 214 to identify starting processes and capture their process IDs is provided below with regard to FIG. 4. In an alternate embodiment, the fault detection driver 214 does not rely on the open call 302 to begin capture of process IDs once it is installed in the Unix system 200.

Once the open call 302 has been issued and communications have been established between the fault monitor 212 and the fault detection driver 214, a read call 308 is issued from the fault monitor 212 to the fault detection driver 214. The read call 308 allows the fault monitor 212 to learn the process ID of a process that it is not already monitoring. When the fault detection driver 214 receives the read call 308, it determines the next process ID or group of process IDs which have not previously been communicated to the fault monitor 212 and provides 310 those process ID to the fault monitor 212. In one embodiment, the read call can receive up to a defined number of process IDs (e.g., 10) per call transaction. When a group of process IDs are read from the fault detection driver 214, they are removed from storage and the memory deallocated. If the fault monitor 212 has already received all process IDs stored by the fault detection driver 214 or the process ID storage is otherwise empty, the read call blocks until there is data available. The read block effectively suspends the monitoring thread that issued the read call. In an alternate embodiment, the fault detection driver 214 returns an appropriate message (not shown) rather than blocking the thread if there are no process IDs in storage. In an alternate embodiment, the fault detection driver 214 maintains a complete list of process IDs and does not remove them from storage when they are read by the fault monitor 212. The fault detection driver 214 returns all process IDs that it is presently storing to the fault monitor 212. It is then left to the fault monitor 212 to determine for which processes it has already started a monitoring thread and for which processes a new thread should be started. In one embodiment, the fault monitor 210 sends a read call to the fault detection driver 214 as soon as it has returned and handled the prior batch of process IDs. In this way, new process IDs are returned in the next read call or immediately fulfill a blocked read call. In an alternate embodiment, receipt of a new process ID from a new process will automatically generate a new process ID message to the fault monitor 212 from the fault detection driver 214. In another alternate embodiment, the fault monitor 212 will issue a periodic read call to the fault detection driver 214 to determine if any new processes have begun. The periodic basis should be sufficiently short to prevent a lag between process start and process monitoring that could cause a process interruption to be missed by the fault monitor 212.

Once the fault monitor 212 has received a process ID for a process running on the Unix system 200, the fault monitor 212 generates 312 a monitoring thread corresponding to the new process ID. A different monitoring thread is used by the fault monitor 212 to track the status of each process. Tracking the status involves tracking the progress of establishing monitoring of the process, the actual status of the process being monitored, and the handling of any interruptions. Each thread includes the process ID and a thread ID. Due to the frequency with which new processes begin in most Unix systems, a thread pooling technique is used to manage the monitoring threads. The fault monitor 212 maintains a pool of monitoring threads. Each time a new process starts, the fault monitor 212 checks the pool to see if there is an unassigned thread waiting for a process to monitor. If there is a thread available, then it is removed from the pool and assigned to the new process. The monitoring thread then attaches to the new process and starts monitoring it. When a process ends, the number of unassigned threads in the pool is checked. If the percentage of unassigned threads compared to the total threads is less than a user configurable limit, then the thread is added back to the pool. If the percentage of unassigned threads is greater than the limit, then the thread is destroyed, freeing related system resources.

For each thread and corresponding process, the fault monitor 212 establishes monitoring of that process. The location of the OS process control file 254 is identified based upon the process ID. For example, the process control file in a Solaris system is accessed through system calls to the process file system (procfs). The fault monitor 212 opens 314 the OS process control file 254. The fault monitor 212 issues a system call to open the OS process control file 254 to be written to. Opening the process control file 254 allows the fault monitor 212 to modify the control messages governing the process and, more specifically, the handling of interrupts. The fault monitor 212 uses 316 its monitoring preferences to determine the control messages to be written to the process control file 254. The monitoring preferences include specific parameters for handling Unix signals that would normally cause a core dump to be generated. The monitoring preferences determine under what circumstances (i.e. combinations of state and signal information) control should be passed to the fault monitor 212, rather than allowing the processing to continue according to default process execution. The monitoring preferences are customizable by a user, such as the system administrator, to allow control over when the fault monitor 212 should become involved in processing. For example, the fault monitor 212 can intervene in the generation of any combination of the following signals: SIGQUIT, SIGILL, SIGTRAP, SIGEMT, SIGFPE, SIGBUS, SIGSEGV, SIGSYS, SIGXCPU, SIGXFSZ, and SIGABRT. The user may select to monitor only SIGBUS, SIGSEGV, and SIGFPE signals and ignore the rest. Additionally, the monitoring preferences may exclude the children of specific processes, such as dbx, adb, or gdb. In an alternate embodiment, the monitoring preferences are standardized for a particular installation or version of the fault monitor 212 and do not support user modification.

Based upon the monitoring preferences, one or more control messages are written 318 to the process control file 254. Example control messages include signal monitoring, exit tracing, process state monitoring, and monitor suspending. In the embodiment shown, a signal monitoring control message is stored 320 in the process control file 254. The signal monitoring control message specifies which Unix signals to monitor for the target process. The list of monitored signals is derived from the monitoring preferences. In general, the signal monitoring control message will identify a plurality of signals that, if not handled by the target process, will cause that process to terminate with a core dump. Example control messages include:
 Message: PCSENTRY
 Parameter: SYS_exit
 Effect: Causes monitor to be signaled when the process being monitored enters the system exit( ) routine.
 Message: PCSTRACE
 Parameter: SIGBUS|SIGSEGV
 Effect: Causes the monitor to be signaled when the process being monitored receives a SIGBUS or SIGSEGV signal.

In the embodiment shown, an exit tracing control message is stored 322 in the process control file 254. The exit tracing control message traces calls to one or more system exit routines. The system exit routines provide for normal termination of processes within the system. Normally, the fault monitor 212 does not intervene in the normal termination of a process and uses the information only to end the corresponding monitoring thread. In Solaris systems, the system exit routine is sysexit( ) and the exit tracing control message identifies calls to sysexit( ).

In the embodiment shown, one or more process state control messages are stored 324 in the process control file 254. These process state control messages place the process in the appropriate state for monitoring. Example control messages include:
 Message: PCSET
 Parameter: PR_RLC
 Effect: Set "Run-on-last-close" flag. If the monitor closes the control file, the monitored process will continue running un-monitored.
 Message: PCWSTOP
 Parameter: none
 Effect: Causes the monitoring thread to suspend until the monitored process stops due to a monitored signal.
 Message: PCRUN
 Parameter: none
 Effect: Tells the monitored process to continue executing.

In the embodiment shown, a monitor suspension control message is also stored 326 in the process control file 254. The monitor suspension control message is written after the other messages in the monitoring set up have been completed. The monitor suspension control message suspends the monitoring thread until the monitored process is interrupted. Interruptions include a traced signal being received by the process or entry into the system exit routine.

The monitoring thread remains in a passive state as long as the process functions normally. However, when an interruption in the process is generated 328, signals reflecting that interruption will be handled in accordance with the messages written to the process control file 254. Receipt of monitored signals ends the suspension of the monitoring thread and control is returned 330 to the fault monitor 212.

The fault monitor 212 uses 332 its signal handling preferences to determine further processing based upon the signal received. To supplement information included in the signal itself, the fault monitor 212 reads 334 the process status stored 336 in the process status file 256. The status information in the process status file 256 allows the fault monitor 212 to determine why the monitored process is being interrupted. The combination of the received signal, the status information, and the process handling preferences determines further handling by the fault monitor 212. Most commonly, the fault monitor 212 will raise 338 an event to the event router 216 based upon the interruption, though this may be dependent upon the signal handling preferences.

The fault monitor 212 may evaluate the signal, status, and preferences and determine that, though the process has stopped, the signal is one which can be handled by the monitored process. This determination is made based upon logic within the fault monitor 212. In this instance, the fault monitor 212 writes a control message back to the process control file 254 to cause it to continue processing and re-writes the monitor suspending control message. Monitoring continues as it had prior to the interruption. The fault monitor 212 may or may not raise 338 an appropriate event to the event router depending on whether or not the interruption was of a variety the user wishes to track (in spite of the fact that it may be handled without a core dump). This may be appropriate for tracking errors that are handled by the process, but represent an occurrence of interest to the system administrators. For example, a data query process may include logic for handling data retrieval errors and preventing a core dump. However, the system administrators may still desire the fault monitor to log those data retrieval errors by raising an event.

The fault monitor 212 may evaluate the signal, status, and preferences and determine that the process has stopped due to entry into a system exit routine. Invocation of the system exit routine typically means normal termination of the monitored process. In this instance, the fault monitor 212 writes 340 a control messages to the process control file 254 to continue processing. The fault monitor 212 then closes 342 the process control file 254 and terminates the monitoring thread associated with the process. The fault monitor may or may not raise 338 and appropriate event to the event router depending on whether or not the user wishes to use the fault monitor 212 to track normal termination of processes.

The fault monitor may evaluate the signal, status, and preferences and determine that the process has stopped due to a signal that it cannot handle. The signal would normally cause a core dump and terminate the process. In this instance, the fault monitor 212 reads specific status information from the process status file 256. For example, the fault monitor 212 may read: error codes (primary and secondary), data model (16 or 32 bit program), program offset at time of signal, effective and actual User ID/Group ID, terminal name, program name, program arguments, process start time, or executable file name and link date.

The fault monitor 212 may initiate additional data collection via the data capturer 218. The fault monitor 212 raises and event to the event router including information describing the process and interruption. For example, error codes (primary and secondary), data model (16 or 32 bit program), program offset at time of signal, effective and actual User ID/Group ID, terminal name, program name, program arguments, process start time, or executable file name and link date, system ID, operating system name/release, CPU ID, and time error occurred at may be sent to the event router. In addition, event identification information such as Event Name ("UNIX"), Event Type ("Unix"), Event version ("V03R00"), Event Description ("From the Fault Manager Solaris agent"), Publisher Name ("UNIX Detect"), and Publisher Version ("03.00.00") are also collected and sent.

The fault monitor 212 then writes a control message to the process control file 254 to continue processing, closes the process control file 254, and terminates the monitoring thread associated with the process. Normally, the operating system will terminate 348 the process with a core dump.

Figure 4:
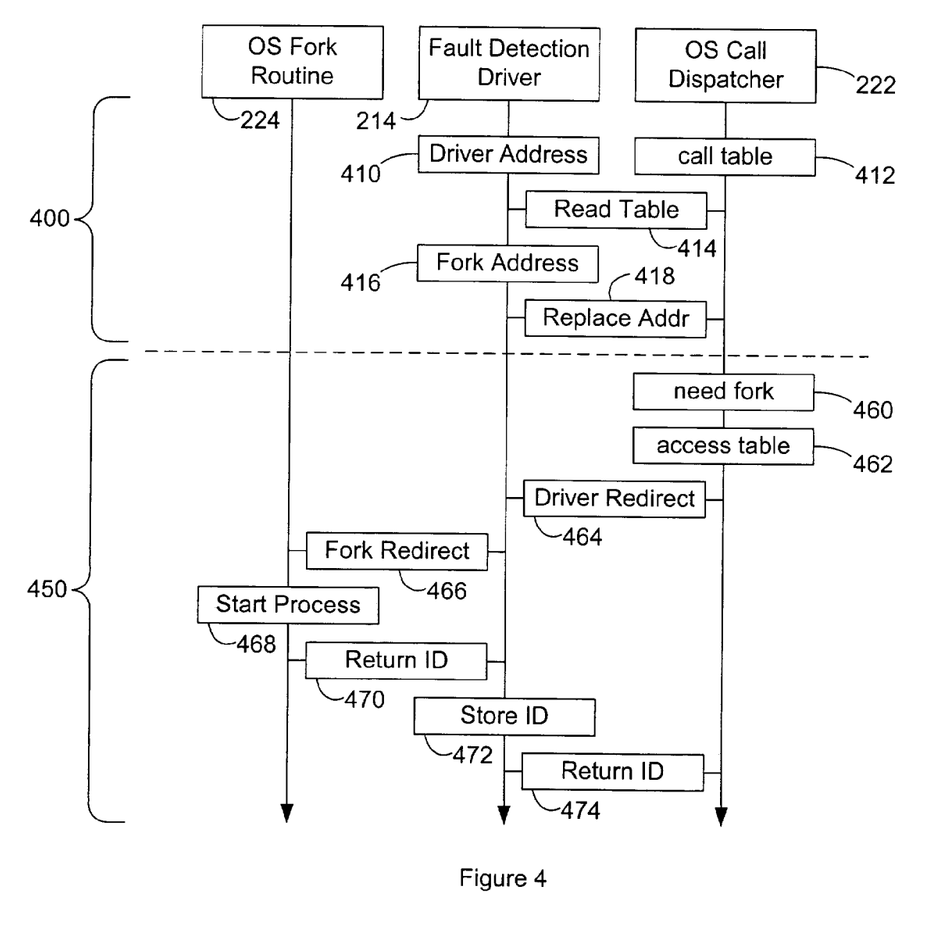
FIG. 4 is a ladder diagram describing the operation of an example fault detection driver in a Unix environment.

FIG. 4 shows the operation of the fault detection driver 214 in capturing process IDs. The fault detection driver 214 is a component of the fault manager 210 that identifies process IDs for new processes as they are initiated. The fault detection driver 214 operates in conjunction with the call dispatcher 222 and the fork routine 224. Without the fault detection driver 214, the call dispatcher 222 would direct processing to the fork routine 224 in order to initiate a new process. The fork routine 224 would initiate the new process and return a process ID for the new process to the call dispatcher 222. The fault detection driver 214 interposes in this process to record the process ID. The upper portion 400 of FIG. 4 shows the preparation of the fault detection driver 214 to monitor process IDs, such as accompanies the open call. The lower portion 450 shows the operation of the fault detection driver 214 after a fork system call has been received by the call dispatcher 222. Note that the preparation operations may be completed multiple times for multiple fork routines. Similarly, parallel operations for capturing process IDs would be handled separately for each fork routine. Multiple fork routines may be handled by separate fault detection drivers or a single fault detection driver with logic to handle multiple types of fork system calls.

The fault detection driver 214 has a driver address 410. The driver address 410 allows other system resources to find and access the fault detection driver 214. Most commonly the driver address 410 corresponds to a memory location where instructions for executing the logic of the fault detection driver is stored. More specifically, the driver address 410 corresponds to logic for forwarding a fork call to the fork routine 224, receiving a process ID, storing that process ID, and forwarding that process ID back to the call dispatcher 222. When the fault detection driver 214 is installed, the driver address 410 is identified and stored in memory associated with the fault detection driver 214.

The call dispatcher 222 includes a call table 412. The call dispatcher 222 uses the call table 412 to locate various system routines to respond to system calls. For example, when the call dispatcher 222 receives a fork system call, it uses the fork call name to access a node in the call table 412. The node provides the address of the actual fork routine. The fault detection driver 214 includes logic for accessing the call table 412 during the preparation process. The fault detection driver 214 reads 414 the call table 412 in order to identify the node corresponding to the address of the fork routine 224. The fault detection driver 214 stores 416 the fork address for the fork routine 224. The fork address will be used by the fault detection driver 222 to direct fork requests it received to the fork routine 224, The fault detection driver 214 replaces 418 the fork address entry in the call table 412 with the driver address 410. The original fork address is overwritten in the call table 412 with the driver address 410. Thus, when the call dispatcher 222 looks up the location in response to an incoming fork system call it passes operation to the fault detection driver, rather than to the fork routine. This operation is further explained in the following paragraphs with regard to the lower portion 450 of FIG. 4.

The call dispatcher 222 receives 460 a request for the fork routine 224. The request for the fork routine is typically the result of a system call issued through the OS to initiate a new process. The call dispatcher 222 accesses the call table 412 in order to identify the location of the requested fork routine. Because of the installation process described above, the call dispatcher actually accesses the driver address 410, which has been stored in the node position corresponding to the fork address. The call dispatcher 222 directs processing to the address contained in the node, thus redirecting 464 the processing to the fault detection driver 214.

When the fault detection driver 214 receives the redirected process from the call dispatcher 222, it redirects 466 processing to the actual fork routine 224. As the calling process, the fault detection driver 214 is made the recipient of the output from the fork routine. The fork routine is then executed to start a new process 468. The initiation of a new process returns 470 a process ID to the fault detection driver 214. The fault detection driver stores 472 the process ID. The fault detection driver 214 includes logic allowing another process, such as the fault monitor 210, to receive the process ID. The fault detection driver returns 474 the process ID automatically to the call dispatcher 222. The call dispatcher 222 completes operations as it would have operated had it interfaced directly with the fork routine 224.

The invention claimed is:

1. A fault management system for operation in a Unix environment, comprising:
   a fault detection driver that determines an identifier for locating operating system resources associated with a process in the Unix environment; and
   a fault monitor in communication with the fault detection driver, the fault monitor selectively signaling an interruption of the process based upon interaction with the operating system resources located with the identifier, and wherein the fault monitor receives the identifier from the fault detection driver and generates a monitoring thread associated with the process.

2. The fault management system of claim 1, wherein the operating system resources associated with the process include a process control file that is accessed when the process is interrupted.

3. The fault management system of claim 2, wherein the fault monitor writes a control message to the process control file that directs a return message to the fault monitor when the process is interrupted.

4. The fault management system of claim 2, wherein the fault monitor includes monitoring preferences related to a plurality of process control signals associated with the process control file.

5. The fault management system of claim 1, wherein the operating system resources associated with the process include a status file and the fault monitor reads the status file to determine the process status.

6. The fault management system of claim 5, wherein the fault monitor includes interruption handling logic for evaluating the process status to selectively signal an interruption.

7. The fault management system of claim 5, wherein the fault monitor selectively stores information from the status file for use in signaling the interruption.

8. The fault management system of claim 1, wherein the fault monitor determines further handling of the process after the interruption.

9. The fault management system of claim 1, further comprising an event router in communication with the fault monitor, the event router receiving an event message signaling the interruption and routing information describing the interruption to a fault handling resource.

10. The fault management system of claim 9, wherein the fault handling resource includes a fault notification system, a fault archive, or a fault analysis application.

11. The fault management system of claim 1, wherein the fault detection driver receives a new process identifier when any new process is initiated in the Unix environment.

12. The fault management system of claim 11, wherein the fault detection driver modifies a call dispatcher to provide the identifier to the fault detection driver when the process is initiated by a fork routine.

13. A method of managing faults in a Unix environment, comprising:
   determining an identifier for a process in the Unix environment;
   monitoring a process control file associated with the process based upon the identifier;
   identifying an interruption in the process from the process control file;
   generating an event message signaling the interruption; and
   writing a control message to the process control file to establish monitoring for the interruption in the process.

14. The method of claim 13, wherein monitoring the process control file includes selectively monitoring a plurality of control signals associated with the process.

15. The method of claim 13, further comprising reading a status file associated with the process for process status information.

16. The method of claim 15, wherein generating the event message includes communicating process status information for the status file.

17. The method of claim 13, further comprising determining further handling of the process after the interruption.

18. The method of claim 13, further comprising routing information describing the interruption to a fault handling resource.

19. The method of claim 13, further comprising automatically detecting a new process in the Unix environment.

20. The method of claim 13, wherein determining the identifier comprises modifying a process table of a call dispatcher in the Unix environment so that the identifier generated by a fork routine is returned.

21. A method of identifying a new process in a Unix environment, comprising:
   storing a driver address;
   reading a fork routine address from a process table;
   storing the fork routine address;
   overwriting the fork routine address in the process table with the driver address;
   receiving a fork request through the process table at the driver address;
   redirecting the fork request to a fork routine using the fork routine address;
   receiving a new process identifier from the fork routine;
   storing the new process identifier; and
   returning the new process identifier through the process table.

22. The method of claim 21, further comprising communicating the new process identifier to a process monitor.

23. A fault management system for operation in a Unix environment, comprising:
   process detection means for determining an identifier for locating operating system resources associated with a process in the Unix environment; and
   process monitoring means in communication with the process detection means, the process monitoring means for selectively signaling an interruption of the process based upon interaction with the operating system resources located with the identifier, for receiving the identifier from the fault detection driver and for generating a monitoring thread associated with the process.

24. The fault management system of claim 23, wherein the process monitoring means uses a process control means associated with the identifier to monitor process control signals indicative of the interruption.

25. The fault management system of claim 23, wherein the process monitoring means uses a process status means associated with the identifier to evaluate the interruption.

26. The fault management system of claim 23, further comprising an event routing means in communication with the process monitoring means, the event routing means for receiving an event message signaling the interruption and routing information describing the interruption to a fault handling resource.

27. A fault management system for operation in a computing environment, comprising:
   a fault detection driver that determines an identifier for locating operating system resources associated with a process in the computing environment; and a fault monitor in communication with the fault detection driver, the fault monitor selectively signaling an interruption of the process based upon interaction with the operating system resources located with the identifier, wherein the operating system resources associated with the process include a process control file that is accessed when the process is interrupted and the fault monitor writes a control message to the process control file that directs a return message to the fault monitor when the process is interrupted.

28. The fault management system of claim 27, wherein the computing environment comprises a Unix environment.

29. A fault management system for operation in a computing environment, comprising:

a fault detection driver that determines an identifier for locating operating system resources associated with a process in the computing environment; and a fault monitor in communication with the fault detection driver, the fault monitor selectively signaling an interruption of the process based upon interaction with the operating system resources located with the identifier, wherein the operating system resources associated with the process include a process control file that is accessed when the process is interrupted and the fault monitor includes monitoring preferences related to a plurality of process control signals associated with the process control file.

30. The fault management system of claim 29, wherein the computing environment comprises a Unix environment.

31. A fault management system for operation in a computing environment, comprising:

a fault detection driver that determines an identifier for locating operating system resources associated with a process in the computing environment; and a fault monitor in communication with the fault detection driver, the fault monitor selectively signaling an interruption of the process based upon interaction with the operating system resources located with the identifier, wherein the fault detection driver receives a new process identifier when any new process is initiated in the computing environment and modifies a call dispatcher to provide the identifier to the fault detection driver when the process is initiated by a fork routine.

32. The fault management system of claim 31, wherein the computing environment comprises a Unix environment.

33. A method of managing faults in a computing environment, comprising:

determining an identifier for a process in the computing environment;

monitoring a process control file associated with the process based upon the identifier;

identifying an interruption in the process from the process control file; and generating an event message signaling the interruption, wherein monitoring the process control file includes selectively monitoring a plurality of control signals associated with the process.

34. The method of claim 33, wherein the computing environment comprises a Unix environment.

35. A method of managing faults in a computing environment, comprising:

determining an identifier for a process in the computing environment;

monitoring a process control file associated with the process based upon the identifier;

identifying an interruption in the process from the process control file; and generating an event message signaling the interruption, wherein determining the identifier comprises modifying a process table of a call dispatcher in the computing environment so that the identifier generated by a fork routine is returned.

36. The method of claim 35, wherein the computing environment comprises a Unix environment.

* * * * *